US012737118B2

(12) United States Patent
Lazovsky et al.

(10) Patent No.: US 12,737,118 B2
(45) Date of Patent: Sep. 15, 2026

(54) PHOTONIC MEMORY FABRIC FOR SYSTEM MEMORY INTERCONNECTION

(71) Applicant: Sicily Merger Sub II, Inc., Santa Clara, CA (US)

(72) Inventors: David Lazovsky, Los Gatos, CA (US); Philip Winterbottom, San Jose, CA (US); Martinus Bos, San Jose, CA (US)

(73) Assignee: Sicily Merger Sub II, Inc., Santa Clara, CA (US)

( * ) Notice: Subject to any disclaimer, the term of this patent is extended or adjusted under 35 U.S.C. 154(b) by 0 days.

(21) Appl. No.: 19/172,441

(22) Filed: Apr. 7, 2025

(65) Prior Publication Data

US 2025/0258606 A1 Aug. 14, 2025

Related U.S. Application Data

(63) Continuation of application No. 17/903,455, filed on Sep. 6, 2022, now Pat. No. 12,271,595.

(Continued)

(51) Int. Cl.

*G06F 3/06* (2006.01)
*G02B 6/12* (2006.01)

(Continued)

(52) U.S. Cl.

CPC ........ *G06F 3/0611* (2013.01); *G02B 6/12019* (2013.01); *G02B 6/1225* (2013.01);

(Continued)

(58) Field of Classification Search

CPC .......................... H04B 10/695; H04Q 11/0062
See application file for complete search history.

(56) References Cited

U.S. PATENT DOCUMENTS 5,541,914 A 7/1996 Krishnamoorthy et al.
6,908,856 B2 6/2005 Beyne et al.

(Continued)

FOREIGN PATENT DOCUMENTS

CN 1484877 A 3/2004
CN 106068579 A 11/2016

(Continued)

OTHER PUBLICATIONS

Chittamuru, Sai Vineel Reddy et al., "BiGNoC: Accelerating Big Data Computing with Application-Specific Photonic Network-on-Chip Architectures", IEEE Transactions on Parallel and Distributed Systems, IEEE, May 8, 2018, vol. 29, Issue 11, 2402-2415, https://ieeexplore.ieee.org/document/8356088.

(Continued)

*Primary Examiner* — Nathan M Cors
(74) *Attorney, Agent, or Firm* — Ray Quinney & Nebeker P.C.; James Bullough

(57) ABSTRACT

One embodiment is a method that includes generating a request for a data item in a memory, obtaining the data item from the memory with a photonic interface, sending the data item to a fabric using a transmit unit of the photonic interface, and routing the data item through a portion of the fabric coupled to the memory, the portion of the fabric including one or more additional transmit and receive units between the photonic interface and a destination receive unit.

14 Claims, 10 Drawing Sheets

Related U.S. Application Data

(60) Provisional application No. 63/321,453, filed on Mar. 18, 2022.

(51) Int. Cl.
*G02B 6/122* (2006.01)
*G02B 6/42* (2006.01)
*H04B 10/69* (2013.01)
*H04B 10/80* (2013.01)
*H04Q 11/00* (2006.01)

(52) U.S. Cl.
CPC ......... *G02B 6/4246* (2013.01); *G06F 3/0655* (2013.01); *G06F 3/0679* (2013.01); *H04B 10/695* (2013.01); *H04B 10/801* (2013.01); *H04Q 11/0062* (2013.01)

(56) References Cited

U.S. PATENT DOCUMENTS 7,734,191 B1 * 6/2010 Welch ................ H04B 10/2914 398/25
8,307,021 B1 11/2012 Dhanoa et al.
9,354,039 B2 5/2016 Mower et al.
9,946,539 B1 4/2018 Temam et al.
10,054,737 B2 8/2018 Kobrinsky et al.
10,268,232 B2 4/2019 Harris et al.
10,365,447 B2 7/2019 Mekis et al.
10,970,809 B1 4/2021 Seiler
11,157,807 B2 10/2021 Abel et al.
11,475,367 B2 10/2022 Lazovich et al.
12,061,978 B2 8/2024 Zalevsky et al.
12,353,006 B2 7/2025 Winterbottom et al.
2002/0118713 A1 8/2002 Shirai et al.
2008/0067677 A1 * 3/2008 Lin ........................ H01L 24/12 257/738
2009/0026607 A1 * 1/2009 Huebner ................ H01L 24/90 257/737
2010/0148210 A1 6/2010 Huang et al.
2010/0266295 A1 10/2010 Zheng et al.
2011/0069963 A1 3/2011 McLaren et al.
2013/0037948 A1 2/2013 Samoilov et al.
2014/0008757 A1 1/2014 Ramachandran et al.
2014/0073134 A1 3/2014 Farooq et al.
2014/0103520 A1 4/2014 Kirby et al.
2014/0203175 A1 7/2014 Kobrinsky et al.
2015/0249073 A1 9/2015 Herrmann
2015/0341119 A1 * 11/2015 Fincato .................... H05K 3/30 398/139
2016/0268163 A1 9/2016 Nakamura
2016/0285581 A1 9/2016 Mickelson et al.
2017/0115458 A1 4/2017 Mekis et al.
2017/0141142 A1 5/2017 Leobandung et al.
2017/0237226 A1 8/2017 Johnson et al.
2019/0012295 A1 1/2019 Yinger et al.
2019/0014341 A1 1/2019 Kondo et al.
2019/0067260 A1 2/2019 Koyama et al.
2019/0067900 A1 2/2019 Bhattacharya et al.
2019/0089466 A1 * 3/2019 Li ...................... H04B 10/5161
2019/0236049 A1 8/2019 Vantrease et al.
2019/0305027 A1 10/2019 Qian et al.
2019/0333905 A1 10/2019 Raghunathan et al.
2019/0391811 A1 12/2019 Garegrat et al.
2020/0209655 A1 7/2020 Roth et al.
2020/0219865 A1 7/2020 Nelson et al.
2020/0234099 A1 7/2020 Wang et al.
2020/0280173 A1 9/2020 Gao et al.
2020/0327403 A1 10/2020 Du et al.
2021/0202562 A1 7/2021 Chang et al.
2021/0215897 A1 * 7/2021 Epitaux ................ G02B 6/4274
2021/0225708 A1 7/2021 Lee et al.
2021/0256360 A1 8/2021 Nam
2021/0266200 A1 8/2021 Yang et al.
2021/0271020 A1 * 9/2021 Islam .................... H01L 25/105
2021/0319076 A1 10/2021 Komuravelli et al.
2021/0373895 A1 12/2021 Shahim et al.
2022/0012013 A1 1/2022 Sebastian et al.
2022/0171605 A1 6/2022 Willcock
2022/0171829 A1 6/2022 Snelgrove
2022/0222174 A1 7/2022 Garegrat et al.
2022/0293820 A1 9/2022 Fitzgerald et al.
2022/0309336 A1 9/2022 Minkin
2023/0006417 A1 1/2023 Von Malm
2023/0152667 A1 5/2023 Miscuglio et al.
2023/0309353 A1 9/2023 Jin et al.
2023/0344518 A1 10/2023 Kalman et al.
2024/0013041 A1 1/2024 Pleros et al.
2025/0253300 A1 8/2025 Aggarwal

FOREIGN PATENT DOCUMENTS

JP 2019523932 A 8/2019
JP 2022543366 A 10/2022
KR 20130007063 A 1/2013
KR 20170140297 A 12/2017
KR 20190137835 A 12/2019

OTHER PUBLICATIONS

Foulk et al.; "Broad Temperature Operation and Widely Tunable High Dynamic Range High-Speed Amplified Electroabsorbtion Modulator", IEEE Photonics Technology Letters, vol. 17, No. 10, Oct. 2005, pp. 2191-2193.
T. Luo et al., "DaDianNao: A Neural Network Supercomputer", IEEE Transactions on Computers, May 30, 2016.
Hendry, et al., "Analysis of Photonic Networks for a Chip Multiprocessor Using Scientific Applications," published at 2009 3rd ACM/IEEE International Symposium on Networks-on-Chip, May 2009, 10 pages.
Ke Wen et al., "Silicon photonic memory interconnect for many-core architectures", 2016 IEEE High Performance Extreme Computing Conference (HPEC), Sep. 13, 2016, 7 pages.
Zhang Yu et al., "Foundry-Enabled Scalable All-to-All Optical Interconnects Using Silicon Nitride Arrayed Waveguide Router Interposers and Silicon Photonic Transceivers", IEEE Journal of Selected Topics in Quantum Electronics, USA, vol. 25, No. 5, Sep. 2019, 9 pages.

* cited by examiner

Figure 3:
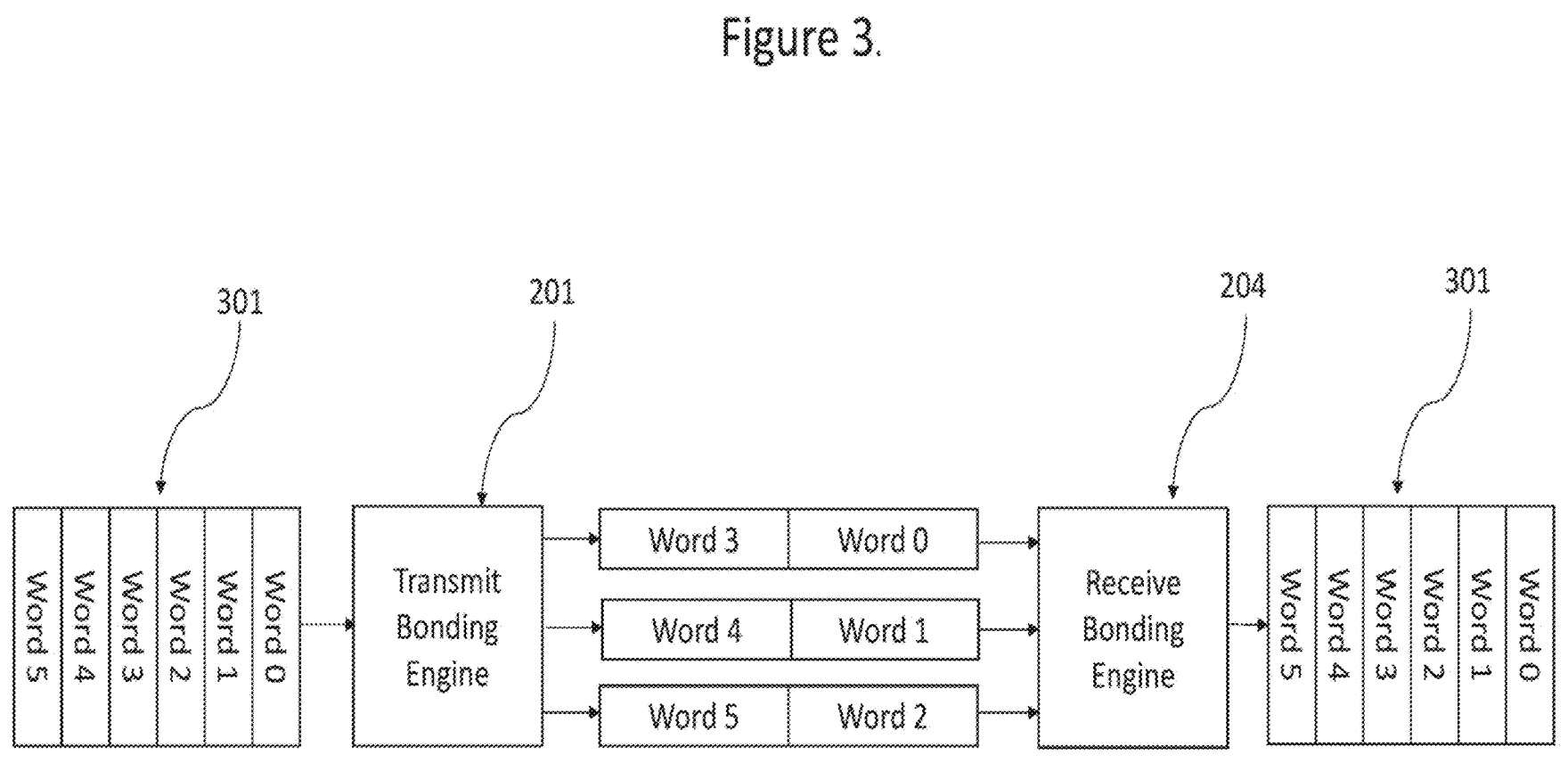

Word 0
Word 1
Word 2
Word 3
Word 4
Word 5

201

Transmit Bonding Engine

Word 0 | Word 3
Word 1 | Word 4
Word 2 | Word 5

204

Receive Bonding Engine

301

Word 0
Word 1
Word 2
Word 3
Word 4
Word 5

Optical Transmit unit
Optical Receive unit
Parallel data-in
Word 3
Word 0
Serializer
DFB Laser
Modulator
Photodiode
TIA
Gain Control
Slicer
DeSerializer
Parallel data-out
401
403
404
405
406
407
408
409
410
411
412
413

508
508
To Router Control Unit
506
Address
Router
505
FIFO
credit
509
504
Transmit Unit
Receive Unit
401
412
502

North Optical
Port Unit
East Optical
Port Unit
Port Unit
Local Electrical
South Optical
Port Unit
Port Unit
Router Control Unit
West Optical
601
601
602
605
606
506

Figure 7
PRIOR ART 703
704
705
DRAM
JEDEC
Silicon Interposer
701
702
706

PHOTONIC MEMORY FABRIC FOR SYSTEM MEMORY INTERCONNECTION

CROSS-REFERENCE TO RELATED APPLICATIONS

The present application claims priority to and incorporates by reference U.S. patent application Ser. No. 17/903,455, filed on Sep. 6, 2022 which claims priority to U.S. Provisional Patent Application Ser. No. 63/321,453, entitled PHOTONIC MEMORY FABRIC FOR MEMORY INTERCONNECTION, filed on Mar. 18, 2022. The present application incorporates by reference, in its entirety, U.S. patent application Ser. No. 17/807,694, entitled MULTI-CHIP ELECTRO-PHOTONIC NETWORK, filed on Jun. 17, 2022.

BACKGROUND

Current electronic processing systems are increasingly constrained by memory latency and bandwidth. As silicon processing node sizes have decreased, the speed and energy consumption of computation have improved while the interconnection to memory has not kept pace. Where improvements in memory bandwidth and latency have been achieved, it has been at the cost of imposing significant constraints on signal integrity and complexity of packaging. State-of-the-art high bandwidth memory (HBM) dynamic random-access memory (DRAM) requires the memory to be mounted on a silicon interposer to be placed within a few millimeters of the client device that uses the memory, with pins that run over electrical wires at over 3 GHz, imposing signal-integrity as well as thermal constraints that are both complex and expensive to meet. Moreover, the need to place the memory elements close to the chips that use them highly constrains the number and arrangement of HBM stacks around the client device and places significant restrictions on the total amount of memory that can be integrated into such a conventional system.

SUMMARY

One embodiment is an apparatus coupled to a memory. The apparatus comprises an interface associated with the memory, the interface having a first transmit unit for sending data from the memory and a first receive unit for receiving data sent to the memory, a fabric connected to the first transmit and receive units, the fabric including a plurality of routers, each of the routers having additional transmit and receive units, the routers arranged in a grid formed by connecting the additional transmit units with the additional receive units via optical links, and a first mesh coupled to a first portion of the memory, the first mesh including a first portion of the routers that create a first connection between the first transmit and receive units and a local electrical router associated with a first one of the routers.

Another embodiment is a system. The system comprises an interface system associated with the memory subsystem, the interface system having a first transmit unit for sending data from the memory subsystem and a first receive unit for receiving data sent to the memory subsystem, a fabric system connected to the first transmit and receive units, the fabric including a plurality of routers, each of the routers having additional transmit and receive units, the routers arranged in a grid formed by connecting the additional transmit units with the additional receive units via optical links, and a first mesh system coupled to a first portion of the memory subsystem, the first mesh system including a first portion of the routers that create a first connection between the first transmit and receive units and a local electrical router associated with a first one of the routers.

Yet another embodiment is a method. The method comprises generating a request for a data item in a memory, obtaining the data item from the memory with a photonic interface, sending the data item to a fabric using a transmit unit of the photonic interface, and routing the data item through a portion of the fabric coupled to the memory, the portion of the fabric including one or more additional transmit and receive units between the photonic interface and a destination receive unit.

BRIEF DESCRIPTION OF THE DRAWINGS

FIG. 3 is a diagram of another embodiment of a photonic channel for use in a memory fabric for system memory interconnection.

FIG. 7 is a diagram of a conventional HBM subsystem.

DETAILED DESCRIPTION

Figure 1:
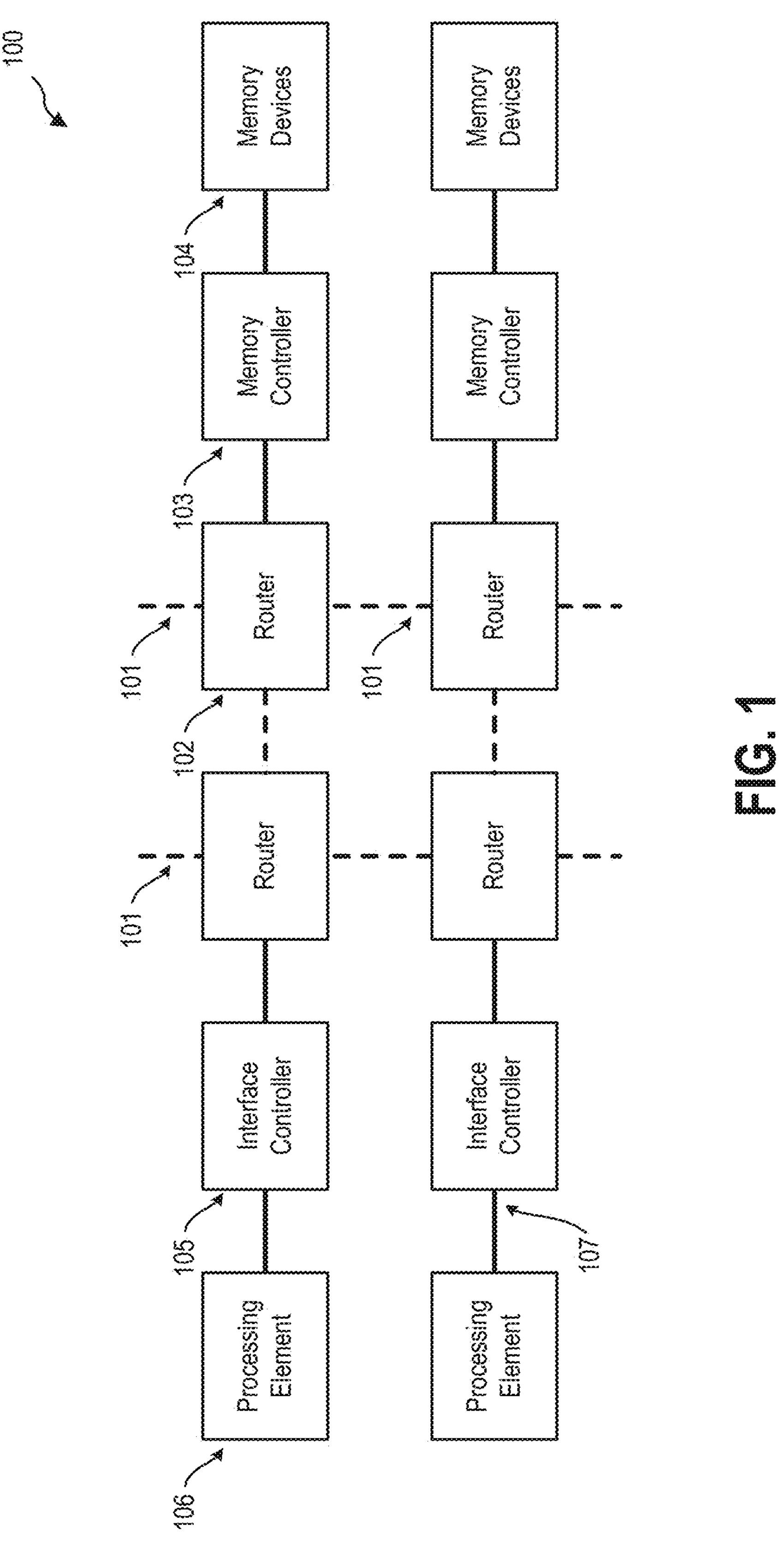
FIG. 1 is a diagram of a photonic memory fabric for system memory interconnection according to one embodiment.

The present application discloses an innovative memory fabric. At least one embodiment of an apparatus, system, or method described herein addresses the location, signal-integrity, and bandwidth constraints of current memory system architectures. As shown in FIG. 1, a memory fabric (100) in accordance with some embodiments includes four main components: a set of one or more photonic channels (101), optionally one or more message routers (102) that enable composition of links into a fabric, one or more memory controllers (103) to connect standard memory devices (104), and one or more interface controllers (105) to connect to processing elements (106). Connections between the routers (102) are made using photonic links (e.g., optical links), whereas the other connections in FIG. 1 may use alternatively electrical buses (107) or photonic links. In certain embodiments, e.g., as described below with reference to FIG. 9, the interface controllers (105) of the processing elements (106) connect electrically to the routers (102), whereas one or more memory controllers (103) are augmented by photonic interface controllers that connect optically to the routers (102) and/or directly to processing elements (106). Many topologies are possible that use one or more photonic links and zero or more routers; examples are described further below.

Figure 2:
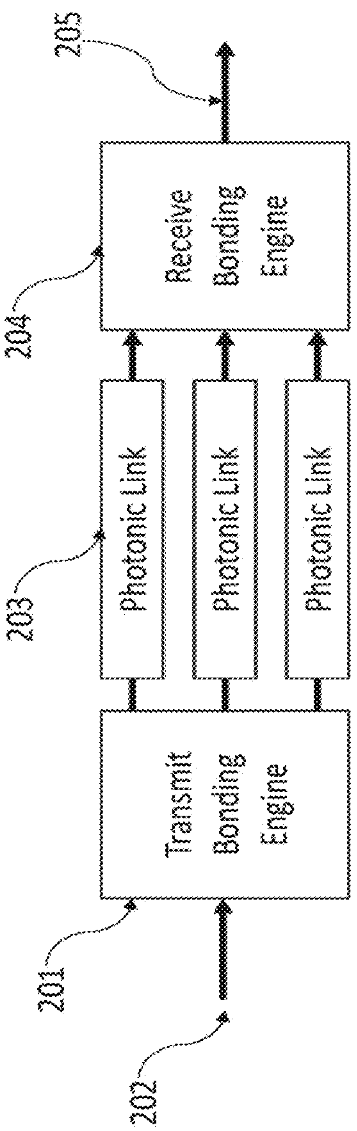
FIG. 2 is a diagram of one embodiment of a photonic channel for use in a memory fabric for system memory interconnection.

A photonic channel contains two unidirectional sets of (one or more) links capable of making a bi-directional channel for transferring a message in the form of a variably sized packet. As shown in FIGS. 2 and 3, multiple unidirectional links in one direction may be bonded together to form a single logical channel that can transfer messages. In this embodiment, a message (202) consisting of a sequence of, e.g., 256-bit words (301) is presented to the transmit bonding engine (201). The transmit bonding engine (201) may split the words (301) evenly across the active photonic links (203). In the depicted example, data (e.g., a data item) arrives at the receive bonding engine (204) on three links. Sequence information added to the words (301) by the transmit bonding engine (201) permits the original message (202) to be assembled in order and sent on the output interface (205) of the receive bonding engine (204). Bonding allows high-bandwidth, low-latency channels to be constructed from several lower-bandwidth links and provides the ability to configure out non-working links.

Figure 4:
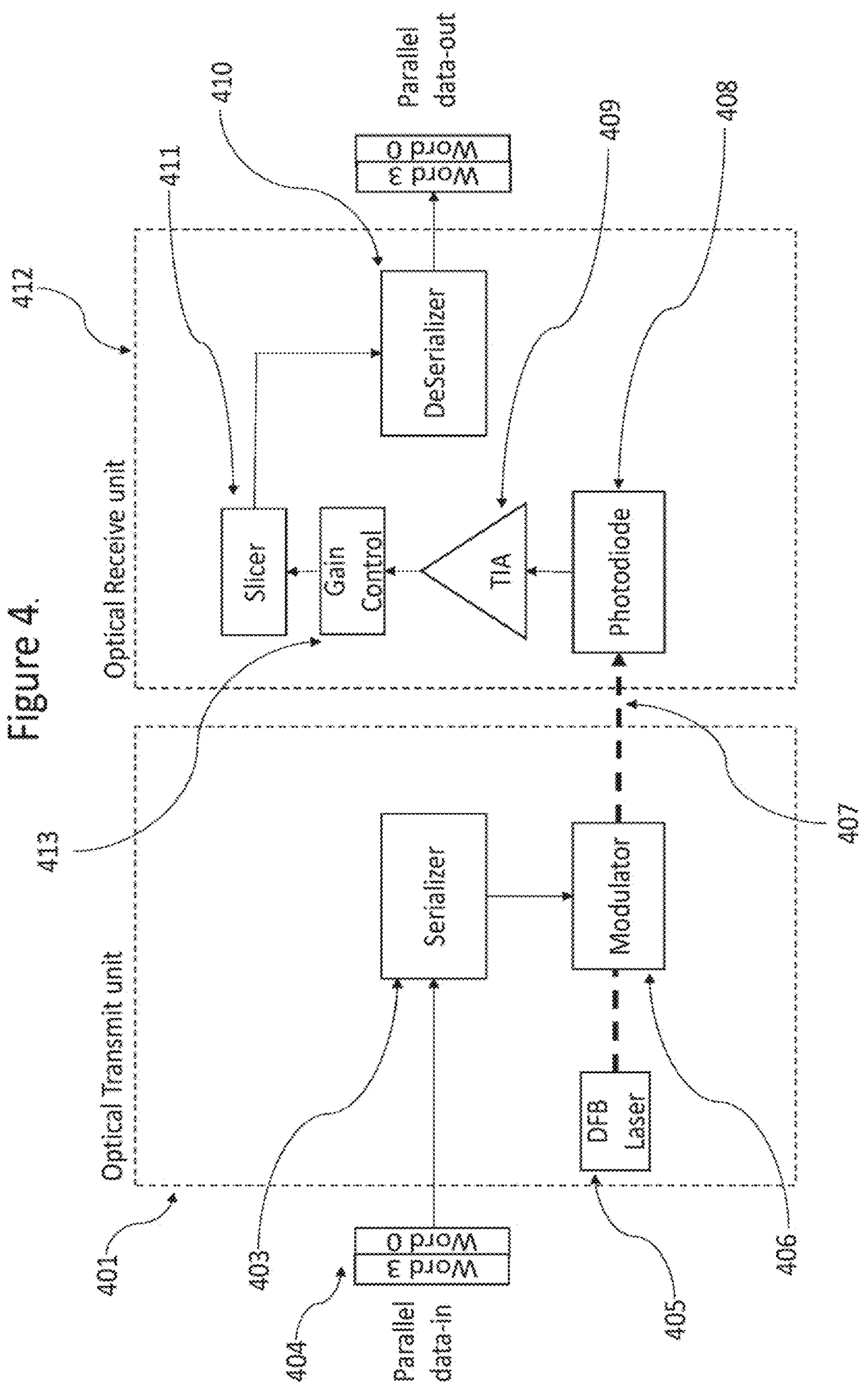
FIG. 4 is a diagram of an embodiment of a transmitter and a receiver that can be used in a memory fabric for system memory interconnection.

As shown in FIG. 4, each link (e.g., 203) in a photonic channel includes an optical transmit unit (401), an optical receive unit (412), and an optical transmission medium (407) (e.g., an optical waveguide or fiber) connecting the transmit unit (401) to the receive unit (412). The transmit unit (401) includes an optical modulator (406) that imparts a message onto an optical signal by modulating carrier light output by a light source (405), and an electrical serializer (403) that converts an electronic message received in the form of parallel data words (404) into a signal suitable for driving the optical modulator (406). The optical modulator (406) may include an electro-absorption modulator (EAM), a micro-ring resonator, a ring modulator, a Mach-Zender interferometer (MZI), and a quantum confined stark effect (QCSE) electro-absorptive modulator. The optical modulator (406) may be coupled to a driver. In some embodiments, the driver is in a photonic-integrated circuit (PIC) or an electronic-integrated circuit (EIC) (e.g., as described in connection with U.S. patent application Ser. No. 17/807,694, entitled MULTI-CHIP ELECTRO-PHOTONIC NETWORK, filed on Jun. 17, 2022, which is hereby incorporated by reference in its entirety). The transmit unit (401) sends data (e.g., from one or more memory devices (104)) to the receive unit (412). The receive unit (412) includes a photodiode (408) to convert the optical signal received via the transmission medium (407) back to an electrical signal, and associated electronics including a transimpedance amplifier (409) and gain control to normalize the signal level (413), a slicer (411) to extract the bit-stream, and a de-serializer (410) to convert the received message back into parallel data. The optical modulator (406) and the electrical serializer (403) are coupled together by an electrical connection such as a copper pillar or C4 bump. Likewise, the photodiode (408) and the transimpedance amplifier (409) are also coupled together via an electrical connection like a copper pillar or C4 bump.

The optical transmission medium (407) may include a waveguide on a photonic-integrated circuit (PIC), an optical fiber or other optical transmission medium (such as free space optics or glass-etched waveguide), or some combination of the foregoing. Examples of optical modulators (406) include, but are not limited to, electro-absorption modulators (EAMs) and micro-ring resonators. The light source (405), which is conceptually part of the transmit unit (401), may be shared between transmit units of multiple photonic links. The light source(s) (405) feeding the modulators (406) may be located locally on the PIC or connect to the PIC via optical fiber. When integrated onto the PIC, distributed fiber Bragg (DFB) lasers or quantum dot lasers can be attached during processing or integrated in the native technology where possible. When remote, any packaged continuous wave (CW) laser suitable in power and spectrum for the modulation technology may be used. In one embodiment, the light source is a set of DFB lasers attached to a silicon interposer and connected to the PIC via optical fibers. In one embodiment, the link is modulated at 56 Gb/s in a non-return-to-zero (NRZ) code, but more spectrally efficient modulation schemes, such as PAM-4 or PAM-8 or higher-order pulse amplitude modulation, may be used to allow higher-bandwidth and lower-latency links.

Figure 5:
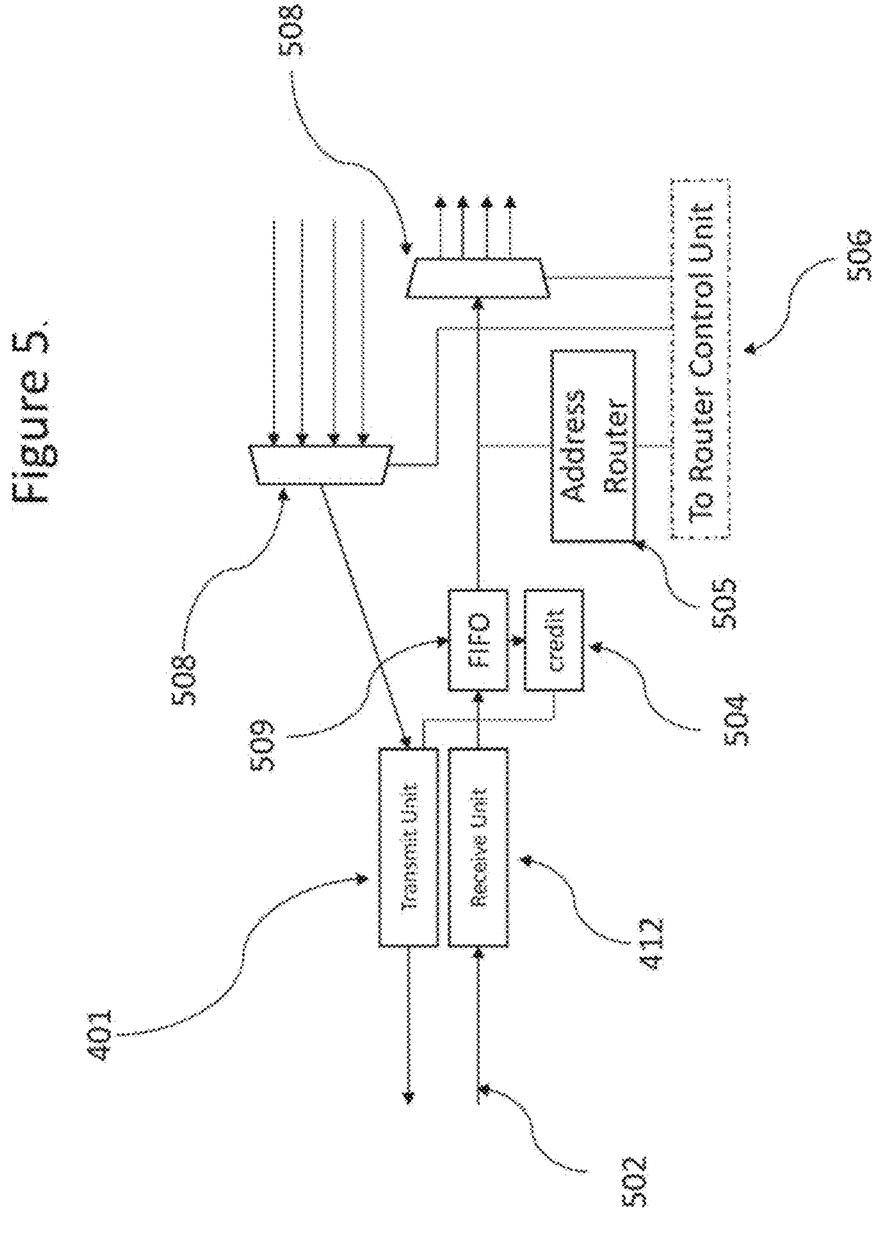
FIG. 5 is a diagram of an embodiment of a message router that can be used in a memory fabric for system memory interconnection.

A photonic channel can be used to directly connect a memory subsystem in a point-to-point fashion, providing dedicated bandwidth between the memory subsystem and a processing element. However, in some embodiments, more complex topologies are created by introducing a routing element that dynamically routes messages between the photonic channels. When a router is used, a portion of the message (e.g., a data item, a first data item, a second data item) having routing information can include the address of the destination photonic-fabric channel, an identifier associated with a compute or a memory mesh, or the like. As shown in FIG. 5, a message arriving at the router is processed by an address router (505) unit that extracts the destination address while the arriving message is stored in a FIFO (first in-first out) buffer (509). A routing algorithm (e.g., a routing module) uses the address bits to select an egress port selected by an output multiplexor (508) based on the fabric topology and routing policy. Coordination of the port units depicted in FIG. 5 are controlled by a router control unit (506) that connects to the data input/output multiplexors (508) and the address router (505) in each port. The router control unit (506) resolves port contention when traffic arrives for the same egress port. In some embodiments, the routing algorithm moves data (e.g., a data item, a first data item, a second data item) between two areas of memory that are each separately linked to a mesh (e.g., a first mesh and a second mesh).

Figure 6:
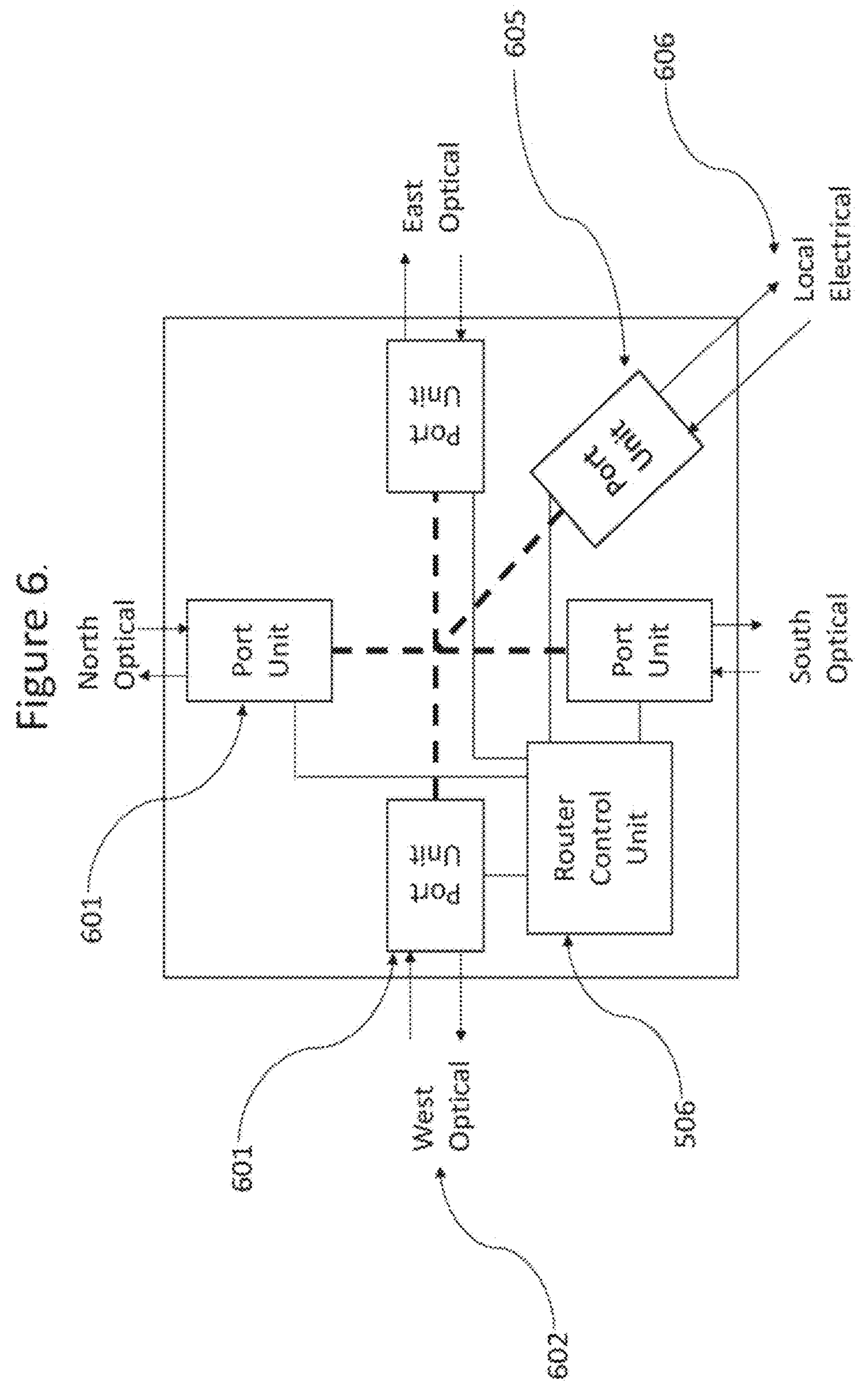
FIG. 6 is a diagram showing an example of the ports that can be used in a router in a memory fabric for system memory interconnection.

Many topologies and routing algorithms are possible for the fabric or a portion of the fabric, such as hyper-cube or mesh. In various embodiments, the topology is a mesh or wrapped mesh. In such a system, each router has four optical ports and one electronic port. As shown in FIG. 6, the four optical ports (601) are connected to the north, south, east, or west routers in the fabric. The port unit multiplexors (508) are connected electrically within the router to provide full connectivity between the port units. The router control unit (506) takes request from the various port units and grants access to an egress port in such a fashion that contentions are resolved. Port units may have optical interfaces (602) or electronic interfaces (606) (e.g., a local electrical router) based on their destination. The local port (605) to resources connected to the router will typically be electrical while the connections between routers are usually photonic. In such a system, a convenient addressing scheme encodes the number of steps left in the north/south or east/west direction. A positive number encodes a move north or east, a negative number south or west. As a message traverses a set of routers, if the message moves north, the north/south portion of the address is decremented; likewise, if the message moves south, the north/south portion of the address is incremented. Equivalently, if the message moves east, the east/west portion of the address is decremented, and if the message moves west, it is incremented. The message address is initialized with the number of steps in each direction required to reach the destination. When both the north/south and east/west fields are zero, the message has arrived at the destination and is delivered to the electrical port.

At the electronic port of each router or at the end of a photonic link in point-to-point architectures, a controller converts messages into a bus protocol that can ultimately be used to access the connected memory. Two examples of such protocols are Peripheral Component Interconnect Express (PCIe) and Advanced Extensible Interface (AX). In one embodiment, AXI transactions are forwarded over the memory fabric. The messages router uses the top 10 bits of the AX address to specify the fabric destination and a further 32 bits to specify memory access information, such as an offset (e.g., memory access information) in the target memory controller. To prevent the ingress FIFOs of the router from overflowing, a flow control scheme should be implemented to control the number of messages in flight in the fabric. This is accomplished by a credit flow control mechanism. A port is initialized with a number of tokens representing memory transactions that are smaller in number than the FIFO at the other end of the link. Every time a new transaction is sent on a link, a credit register (504) on the egress port is examined. Each memory transaction is a certain number of credits in size. If there are more than memory transaction size credits in the egress port credit register, then transmission can proceed, and the number of tokens is reduced by memory transaction size credits. If there are insufficient credits, the transmission is stalled. When a receiver process removes a message from the ingress FIFO, a credit message with memory transaction size credits is sent back on the link. Upon receiving the credit, the egress credit register is incremented, and if sufficient credits are now available to transmit any stalled messages, the transmission process can be restarted. Dynamic routing decisions are made when alternate valid routes are available. In such a case, the path with most credits is selected, which provides load balancing within the fabric.

The photonic links and photonic fabric described above can be employed to provide photonic connection to generally any memory subsystem augmented with a suitable photonic interface controller. As herein understood, a memory subsystem includes a set of one or more memory devices and a memory controller coupled to the set of memory devices to provide access to data stored thereon. The photonic interface controller connects the memory controller to the photonic interface (e.g., interface system) associated with a photonic channel, such as with the optical modulator and photodetector of a bidirectional channel. The memory controller and photonic interface controller may be implemented in separated die that interface with each other, or alternatively in a single die. In some embodiments, the memory subsystem is a memory stack device that includes a stack of DRAM die.

Figure 7:
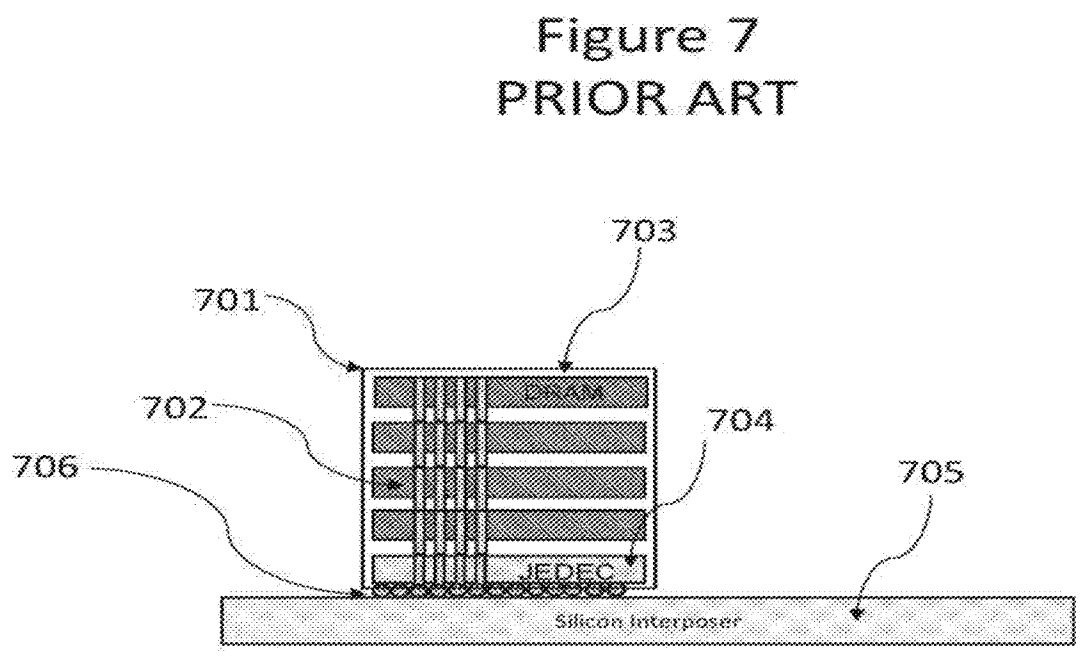

Photonic memory connections as described are especially useful to implement complex, scalable HBM (701) systems. In a conventional HBM subsystem, as shown in FIG. 7, a stack of DRAM (703) die is connected using through-silicon via (TSV) technology (702). At the base of the stack, a DRAM controller presents a Joint Electron Device Engineering Council (JEDEC) (704) compliant interface out of the bottom the stack that connects to the system via a silicon interposer (705) using bump attach (706) and a DRAM control interface up into the DRAM stack above to access the memory itself and perform bookkeeping tasks such as memory refresh.

Figure 8:
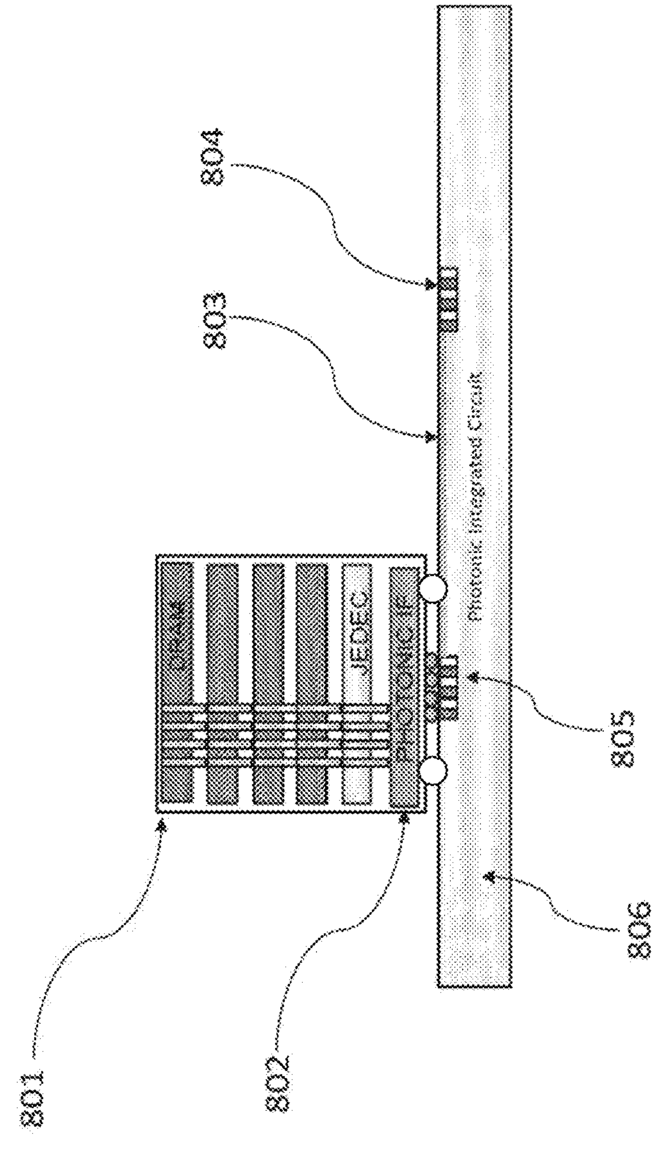
FIG. 8 is a diagram of an HBM subsystem according to one embodiment.

In an example implementation of photonically connected memory in accordance with an embodiment, illustrated in FIG. 8, an additional controller layer (802) is added to the base of the HBM stack (801). This additional controller layer (802) serves as a photonic interface controller that connects the (standard) DRAM controller to the optical modulator and photodetector of a bidirectional channel. Thus, addition of this controller layer (802) converts the standard HBM JEDEC interface into a photonic-fabric interface that in turn connects to the modulators and photodiodes (805) in the photonic-integrated circuit (806). This arrangement enables the use of standard HBM modules connected over long distances, using waveguides (803), optical fibers, or some other optical transmission media that finally terminate in another fabric interface elsewhere in the system (804). In an alternative embodiment, the DRAM controller and the photonic interface controller are integrated into a single layer (or single functional unit) at the base of the HBM stack for further optimization.

Figure 9:
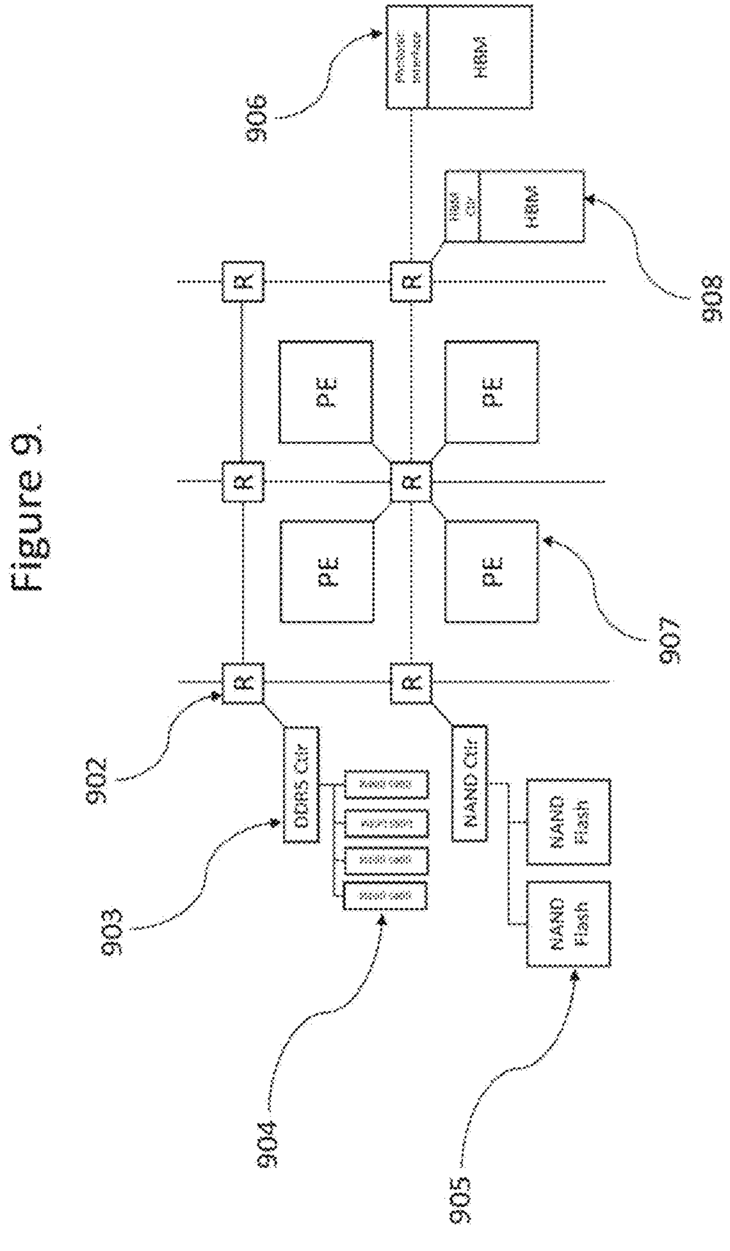
FIG. 9 is a diagram of a photonic memory fabric connected to a variety of memory types according to one embodiment.

The memory fabric architecture is agnostic to the type of connected memory. As shown in FIG. 9, different memory controllers allow connecting different types of memory to the photonic memory fabric. In the depicted embodiment, the core of the system is an arrangement of processing elements (907) that are electrically connected to photonic routers (902), which are in turn connected in a sub-fabric or mesh. Memory controllers can then be connected to either the electrical ports of the routers (as shown for memory controller (903)) or, when augmented by or integrated with a photonic interface controller (906), via a photonic channel to a photonic port of the router. Non-limiting examples of memory types for which it is desirable to provide connectivity are NAND Flash memory (905) (including but not limited to solid-state drive (SSD) memory), NOR Flash memory (including conventional CMOS memory and thin film transistor-based memory), phase change memory (PCM), storage class memory (SCM) such as Optane, magneto-resistive memory (MRAM), resistive RAM (ReRAM or RRAM), and traditional DRAM (including HBM (908) and DDR-based DRAM (904). An HBM equipped with a photonic interface controller (906) layer that includes a routing element provides a scalable photonically connected memory that can be stacked like DIMM memory. A selection of memory controllers with different interfaces permits the construction of both heterogenous and homogenous memory systems (e.g., a combination of multiple types of the memories described above).

An important aspect of the memory fabric is to enable the construction of complex topologies of memories that best serve the application requirements. While this discussion of topologies focuses on HBM, it is equally applicable to other types of memory. In the simplest arrangement, a set of point-to-point channels connect an HBM stack to one or more fabric interfaces located in the same or several chips. The benefit of this arrangement is two-fold. First, the system designer is relieved of the distance constraints of the HBM JEDEC interface, and the HBM memory can be placed arbitrarily far from the client chip if it is within the optical budget of the photonic links (typically several meters). This permits higher-density memory systems than can currently be constructed using electrical interfaces. Furthermore, there can be significant energy savings when the photonic fabric interface is located at the center of a large die, where photonic transport of the data is more efficient than an equivalent high-bandwidth electrical interconnect in the client chip itself. The second benefit derives from being able to control the power density of the system by spacing the memory and client chips (e.g., implementing processing elements) to optimize cooling efficiency, as the distances are no longer dictated by the electrical interfaces. More complex topologies can be composed by integrating routers in both memory and client-chip components. The use of photonic memory fabrics permits arbitrary grouping of memory and client chips that best serve the bandwidth and connectivity needs of applications. Groups of memory can surround a client chip on a single interposer, and several chips and memory can be integrated onto a single interposer. Special-purpose memory and compute subsystems on separate interposers can be networked together using any of the optical transport mediums outlined above, and using a mixture of fabric topologies that may vary from a single or set of point-to-point links aggregated on ribbon fibers to mesh and hyper-cube topologies providing significantly richer and higher bandwidth topologies that utilize various collections of waveguides and optical fibers to connect the components.

Figure 10:
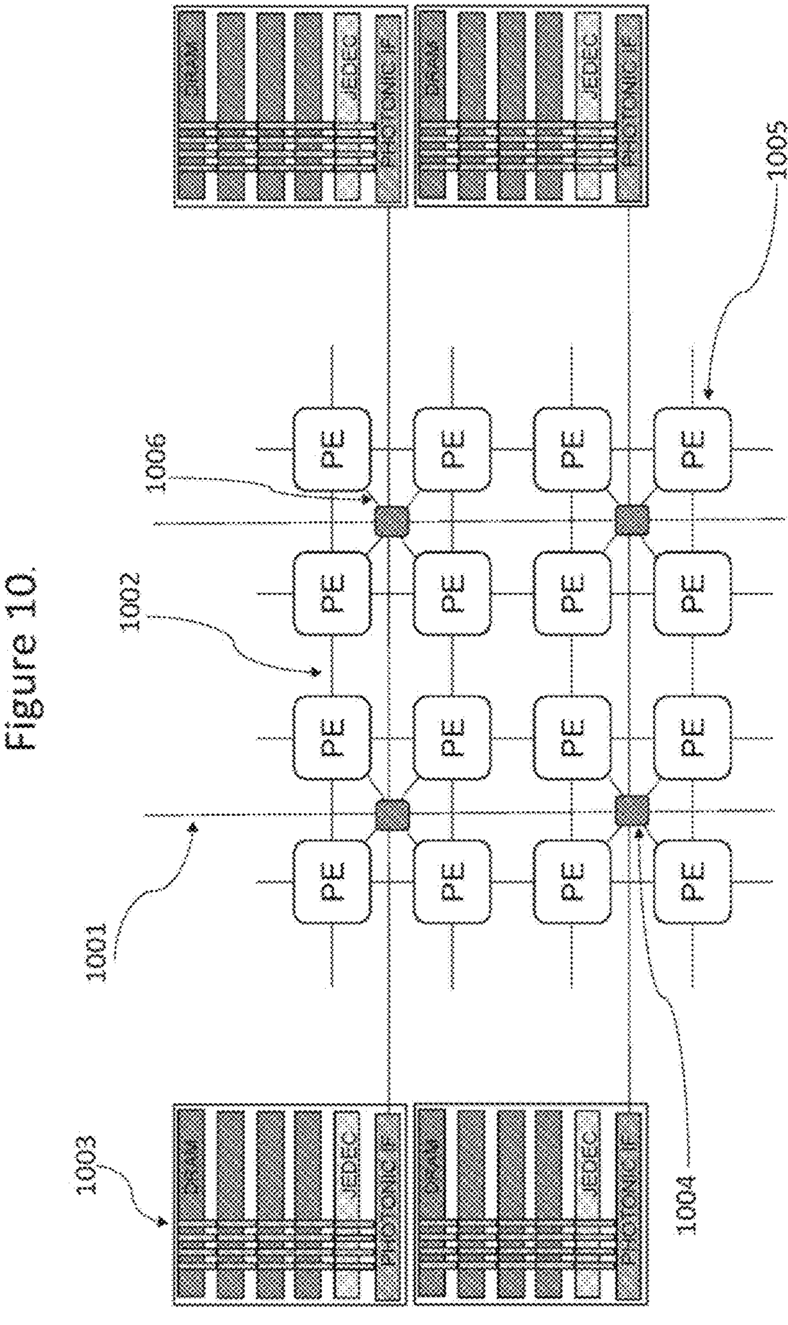
FIG. 10 is a diagram of a photonic memory fabric for system memory interconnection according to one embodiment.

The disclosed memory fabric may be used to augment the processing system described in the U.S. patent application entitled "MULTI-CHIP ELECTRO-PHOTONIC NETWORK", which has been incorporated by reference herein. Memory and compute traffic over a photonic fabric have different characteristics: compute traffic usually involves short hops between adject processing elements, while memory traffic often travels long distances from memory arrays located away from the processor but requires very high bandwidth to support HBM memory. As shown in FIG. 10, in one beneficial implementation, a balance can be achieved by overlaying two mesh networks—a memory mesh (1001) and a compute mesh (1002). The compute mesh (1002) is a densely connected nearest-neighbor mesh connecting all of the processing elements (1005) in the system. The memory mesh (1001) is a lower-density mesh with wider channels that feeds groups of compute elements from router nodes (1004) placed equidistant from a cluster of processing elements (1005) and connects (1006) directly to memory subsystems (1003). The architectural split of memory and compute networks allows each to be optimized for the magnitude of data, traffic patterns, and bandwidth of each fabric application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system-in-package, comprising:

a computing resource; and an interface associated with the computing resource, the interface comprising:

a first transmit unit for sending data from the computing resource via a first optical link, wherein the first transmit unit comprises a driver connected to a modulator, and a serializer, the driver being disposed in a photonic-integrated circuit (PIC) and connected to the serializer, wherein the serializer provides an output to the driver;

a first receive unit for receiving data sent to the computing resource via a second optical link, wherein the first receive unit comprises a photodetector a deserializer;

at least one additional transmit unit for sending data from the computing resource via a first one or more additional optical links of a bidirectional channel and at least one additional receive unit for receiving data sent to the computing resource via a second one or more additional optical links of the bidirectional channel; and a transmit bonding engine for splitting the data sent from the computing resource across the first optical link and the first one or more additional optical links and a receive bonding engine for assembling received data sent to the computing resource across the second optical link and the second one or more additional optical links.

2. The system-in-package of claim 1, wherein the first optical link comprises a first waveguide from the modulator to a second receive unit associated with a second computing resource.

3. The system-in-package of claim 2 wherein the second optical link comprises a second waveguide from a second transmit unit associated with the second computing resource to the photodetector.

4. The system-in-package of claim 3, further comprising a third transmit unit for sending data from the computing resource via a third optical link wherein the first transmit unit comprises a second driver connected to a second modulator, and a second serializer, wherein the third optical link comprises an optical pathway that uses an optical interface that guides light from a waveguide into a fiber.

5. The system-in-package of claim 1, wherein the computing resource is one or more of a memory element or a processing element.

6. The system-in-package of claim 1, wherein the serializer converts an electronic message received in a form of parallel data into a signal suitable for driving the modulator, and wherein the deserializer converts a received message back into parallel data.

7. The system-in-package of claim 1, wherein the modulator is selected from the group consisting of an electro-absorption modulator (EAM), a micro-ring resonator, a ring modulator, a Mach-Zender interferometer (MZI), and a quantum confined stark effect (QCSE) electro-absorptive modulator.

8. The system-in-package of claim 1, wherein the computing resource is one or more of a NAND Flash memory, a solid-state drive (SSD) memory, a NOR Flash memory, a CMOS memory, a thin film transistor-based memory, a phase change memory (PCM), a storage class memory (SCM), a magneto-resistive memory (MRAM), a resistive RAM, a DRAM, an HBM, a DDR-based DRAM, or a DIMM memory.

9. The system-in-package of claim 1, wherein the computing resource includes a combination of at least one memory element that provides access to memory traffic and a processing element that provides access to compute traffic.

10. The system-in-package of claim 1, wherein the first receive unit further comprises:

a gain control to normalize a signal level of a signal containing the data sent to the computing resource via the second optical link; and a slicer to extract a bit-stream that is provided as an input to a de-serializer for converting the data sent to the computing resource into parallel data.

11. A system-in-package, comprising:

a first computing resource;

a second computing resource; and a fabric coupled to the first computing resource and the second computing resource, the fabric comprising:

a first interface associated with the first computing resource, the first interface comprising:

a first transmit unit for sending data from the first computing resource via a first optical link of a bidirectional channel, the first transmit unit comprising a first driver connected to a first modulator, the first driver and the first modulator being implemented in a photonic integrated circuit (PIC), and a first serializer in a first electronic integrated circuit (EIC), the first driver being connected to the first serializer, wherein the first serializer provides a first output to the first driver; and a first receive unit for receiving data sent to the first computing resource via a second optical link of the bidirectional channel, the first receive unit comprising a photodetector in the PIC, and a first deserializer in the first EIC;

at least one additional transmit unit for sending data from the first computing resource via a first one or more additional first optical links of the bidirectional channel;

at least one additional first receive unit for receiving data sent to the first computing resource via a second one or more additional first optical links of the bidirectional channel;

a transmit bonding engine for splitting the data sent from the first computing resource across the first optical link and the first one or more additional optical links; and a receive bonding engine for assembling received data sent to the first computing resource across the second optical link and the second one or more first additional optical links;

a second interface associated with the second computing resource, the second interface comprising:

a second transmit unit for sending data from the second computing resource via the second optical link of the bidirectional channel, the second transmit unit comprising a second driver connected to a second modulator, the second driver and the second modulator being implemented in the PIC, and a second serializer in a second EIC, the second driver being connected to the second serializer, wherein the second serializer provides a second output to the second driver; and a second receive unit for receiving data sent to the second computing resource via the first optical link of the bidirectional channel, the second receive unit comprising a second photodetector in the PIC, and a second deserializer in the second EIC.

12. The system-in-package of claim 11, wherein each computing resource of the first computing resource and the second computing resource is one or more of a memory element or a processing element.

13. The system-in-package of claim 11, wherein each modulator of the first modulator and the second modulator is selected from the group consisting of an electro-absorption modulator (EAM), a micro-ring resonator, a ring modulator, a Mach-Zender interferometer (MZI), and a quantum confined stark effect (QCSE) electro-absorptive modulator.

14. The system-in-package of claim 11, wherein each computing resource of the first computing resource and the second computing resource is one or more of a NAND Flash memory, a solid-state drive (SSD) memory, a NOR Flash memory, a CMOS memory, a thin film transistor-based memory, a phase change memory (PCM), a storage class memory (SCM), a magneto-resistive memory (MRAM), a resistive RAM, a DRAM, an HBM, a DDR-based DRAM, or a DIMM memory.

* * * * *